US00RE46246E

(19) United States
(12) Reissued Patent
Wagner et al.

(10) Patent Number: US RE46,246 E
(45) Date of Reissued Patent: Dec. 27, 2016

(54) STORAGE TOTE HAVING LEGS

(71) Applicant: Western Industries, Inc., Watertown, WI (US)

(72) Inventors: Charles E. Wagner, Coweta, OK (US); Scott M. Herndon, Arkansas City, KS (US); David L. Barthuly, Winfield, KS (US)

(73) Assignee: Western Industries, Inc., Watertown, WI (US)

(21) Appl. No.: 29/474,766

(22) Filed: Jan. 16, 2015

Related U.S. Patent Documents

Reissue of:
(64) Patent No.: Des. 701,734
Issued: Apr. 1, 2014
Appl. No.: 29/436,886
Filed: Nov. 9, 2012

U.S. Applications:
(63) Continuation of application No. 13/276,777, filed on Oct. 19, 2011, now Pat. No. 8,844,950.

(51) LOC (10) Cl. ..... 07-01
(52) U.S. Cl.
USPC ..... D7/605
(58) Field of Classification Search
USPC ..... D7/605; D3/273, 274; D6/708, 708.16, D6/709, 709.2; D34/12, 17, 23, 24, 27; 108/11, 14, 77; 280/28, 29, 30, 12, 37, 280/38, 47.24, 47.21, 47.17, 47.23, 47.33, 280/47.2, 79.2, 655, 645, 655.1, 652, 638; 62/457.1–457.9, 371, 372; 190/12 R, 11, 190/18 A, 18 R (Continued)

(56) References Cited

U.S. PATENT DOCUMENTS 2,603,500 A * 7/1952 Messier ..... 280/43.24
2,663,391 A * 12/1953 Kuhns ..... 190/12 R (Continued)

*Primary Examiner* — Darlington Ly
(74) *Attorney, Agent, or Firm* — Boyle Fredrickson, S.C.

(57) CLAIM

The ornamental design for a storage tote having legs, as shown and described.

DESCRIPTION

FIG. 1 is [an isometric] *a front perspective* view of a storage tote having legs *with the legs extended*, embodying a new design;
FIG. 2 is [an isometric] *a front* view of the storage tote having legs of FIG. 1 [showing the legs in a folded position];
FIG. 3 is a rear [elevation] view, *opposite FIG. 2,* of the storage tote having legs of FIG. 1;
*FIG. 4 is a front perspective view of the storage tote having legs of FIG. 1 with the legs in the folded position;*
FIG. [4] *5* is a [front elevation] *rear* view of the storage tote having legs of FIG. [1] *4*;
FIG. [5] *6* is [an end elevation] *a front* view, *opposite FIG. 5,* of the storage tote having legs of FIG. [1] *4*;
FIG. [6] *7* is [an opposite end elevation] *a side* view of the storage tote having legs of FIG. 1;
FIG. [7] *8* is a [rear elevation] *side* view of the storage tote having legs [as shown in] *of* FIG. [2] *4*; [and]
FIG. [8] *9* is [an end elevation] *a side* view, *opposite FIG. 8,* of the storage tote having legs [as shown in] *of* FIG. [2.] *4;*
*FIG. 10 is a sectional view of FIG. 6 taken along line 10-10 of the storage tote having legs of FIG. 1; and,*
*FIG. 11 is a sectional view of FIG. 5 taken along line 11-11 of the storage tote having legs of FIG. 4.*
The broken lines shown in the drawings [are for illustrative purposes only and] *illustrate portions of the storage tote having legs that* form no part of the claimed design.

1 Claim, 11 Drawing Sheets

Matter enclosed in heavy brackets [ ] appears in the original patent but forms no part of this reissue; matter printed in italics indicates the additions made by reissue.

(Amended)

(58) Field of Classification Search
CPC ..... B25H 1/04; B25H 1/12; B25H 3/02; B62B 1/20
See application file for complete search history.

(56) References Cited

U.S. PATENT DOCUMENTS

| | | | | | |
|---|---|---|---|---|---|
| 2,956,849 | A | * | 10/1960 | Dow | 108/14 |
| 3,009,750 | A | * | 11/1961 | Hendricks | 108/11 |
| D212,440 | S | * | 10/1968 | Cannon | D7/313 |
| 3,608,600 | A | | 9/1971 | Lehrman | |
| 3,873,114 | A | | 3/1975 | Brown | |
| 4,049,091 | A | * | 9/1977 | Chubb | 190/18 R |
| 4,581,902 | A | * | 4/1986 | Starck et al. | 190/11 |
| D302,922 | S | * | 8/1989 | Carlson | D7/605 |
| 4,934,549 | A | | 6/1990 | Allen | |
| 5,082,301 | A | * | 1/1992 | Schumacher et al. | 280/38 |
| 5,240,264 | A | | 8/1993 | Williams | |
| 5,249,438 | A | | 10/1993 | Rhaney et al. | |
| 5,285,656 | A | | 2/1994 | Peters | |
| 5,480,170 | A | | 1/1996 | Kaiser, III | |
| D368,387 | S | * | 4/1996 | Bureau | D6/686 |
| 5,551,558 | A | | 9/1996 | Bureau | |
| D379,887 | S | * | 6/1997 | Muller-Deisig et al. | D6/644 |
| 5,730,282 | A | | 3/1998 | Bureau | |
| D421,696 | S | * | 3/2000 | Hendrix | D7/605 |
| 6,068,355 | A | * | 5/2000 | Thorp | 190/11 |
| 6,129,180 | A | * | 10/2000 | Brady | 182/186.4 |
| 6,161,486 | A | * | 12/2000 | Boots | 108/33 |
| D437,736 | S | * | 2/2001 | Moffett et al. | D7/605 |
| 6,213,265 | B1 | * | 4/2001 | Wang | 190/11 |
| 6,216,488 | B1 | * | 4/2001 | Rucker | 62/457.7 |
| 6,257,229 | B1 | | 7/2001 | Stewart et al. | |
| D448,624 | S | * | 10/2001 | Moffett et al. | D7/605 |
| D448,625 | S | * | 10/2001 | Moffett et al. | D7/605 |
| 6,328,179 | B1 | | 12/2001 | Conrado et al. | |
| D467,453 | S | * | 12/2002 | Kwon | D6/499 |
| 6,612,127 | B2 | * | 9/2003 | Simmons | 62/457.2 |
| 6,739,150 | B2 | * | 5/2004 | Mompo Garcia | 62/457.7 |
| 6,814,333 | B1 | * | 11/2004 | Freiburger | 248/150 |
| D506,887 | S | * | 7/2005 | McDiarmid | D6/648.1 |
| D514,891 | S | * | 2/2006 | Garcia et al. | D7/605 |
| D520,305 | S | * | 5/2006 | Brodock et al. | D7/605 |
| 7,143,601 | B1 | * | 12/2006 | Jimenez | 62/457.7 |
| 7,156,273 | B2 | | 1/2007 | Morris | |
| 7,249,771 | B1 | | 7/2007 | Brennan et al. | |
| 7,341,164 | B2 | | 3/2008 | Barquist et al. | |
| 7,360,784 | B2 | | 4/2008 | Stewart et al. | |
| D580,232 | S | * | 11/2008 | Lee | D7/606 |
| 7,451,709 | B2 | | 11/2008 | Swartfager et al. | |
| D591,562 | S | * | 5/2009 | Lee | D7/606 |
| 7,604,290 | B1 | | 10/2009 | Giordano | |
| 7,607,630 | B2 | | 10/2009 | Jung et al. | |
| 7,658,388 | B1 | * | 2/2010 | Rodriguez et al. | 280/30 |
| 7,708,160 | B2 | | 5/2010 | Booth et al. | |
| D622,518 | S | | 8/2010 | Jordan | |
| 7,766,179 | B2 | | 8/2010 | George et al. | |
| 7,845,653 | B2 | | 12/2010 | Katz | |
| 7,896,451 | B2 | | 3/2011 | Walsh | |
| 7,954,183 | B2 | | 6/2011 | Cawthon | |
| D641,186 | S | * | 7/2011 | Martin et al. | D6/495 |
| D651,430 | S | * | 1/2012 | Martin et al. | D6/708 |
| D701,734 | S | * | 4/2014 | Wagner et al. | D7/605 |
| 8,882,064 | B2 | * | 11/2014 | Gregg et al. | 248/164 |
| 2004/0182381 | A1 | * | 9/2004 | Yeh | 126/25 R |
| 2006/0065665 | A1 | * | 3/2006 | Swartfager et al. | 220/592.2 |
| 2009/0266833 | A1 | | 10/2009 | Savage et al. | |
| 2011/0315695 | A1 | | 12/2011 | Fuqua | |

* cited by examiner

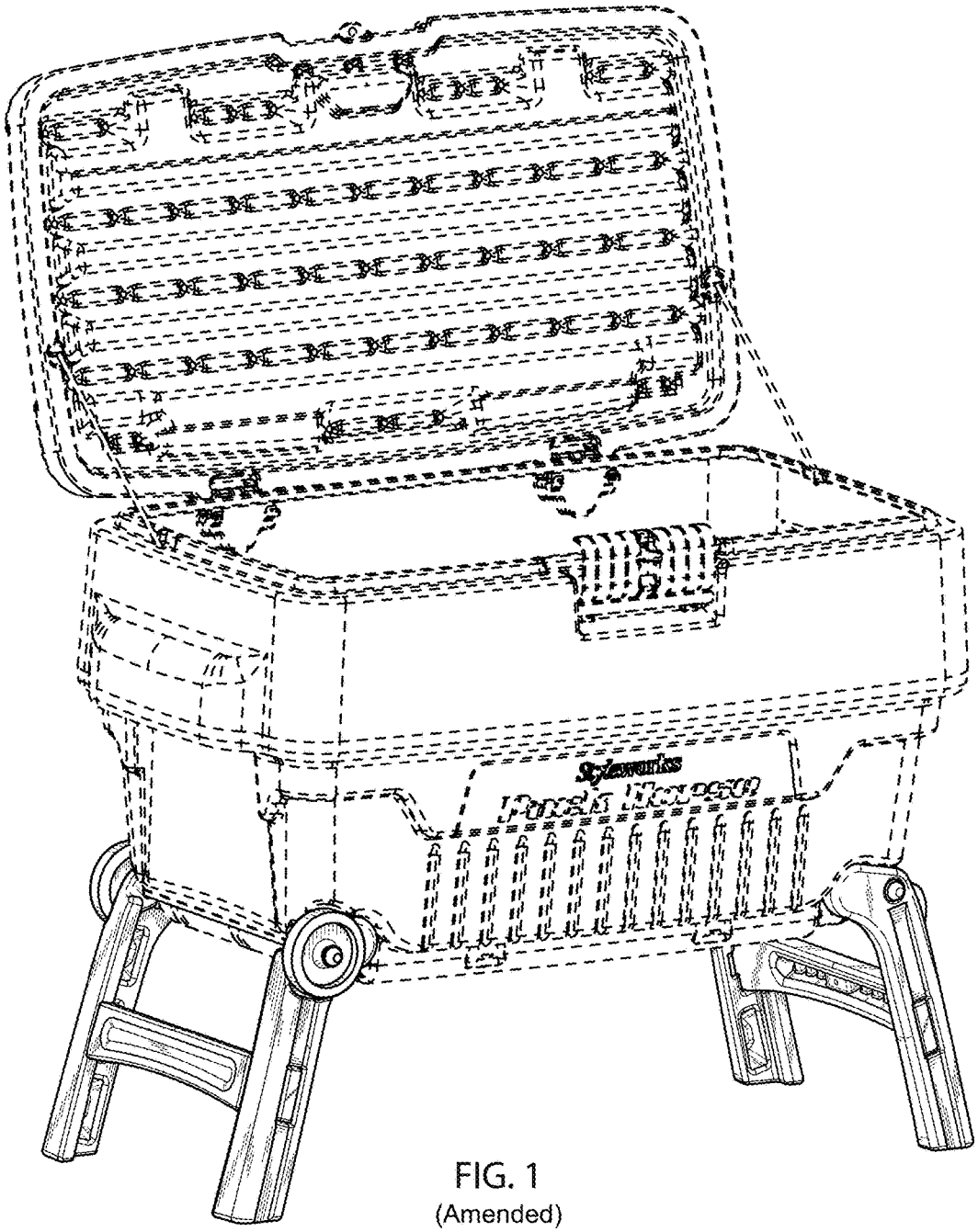
FIG. 1
(Amended)

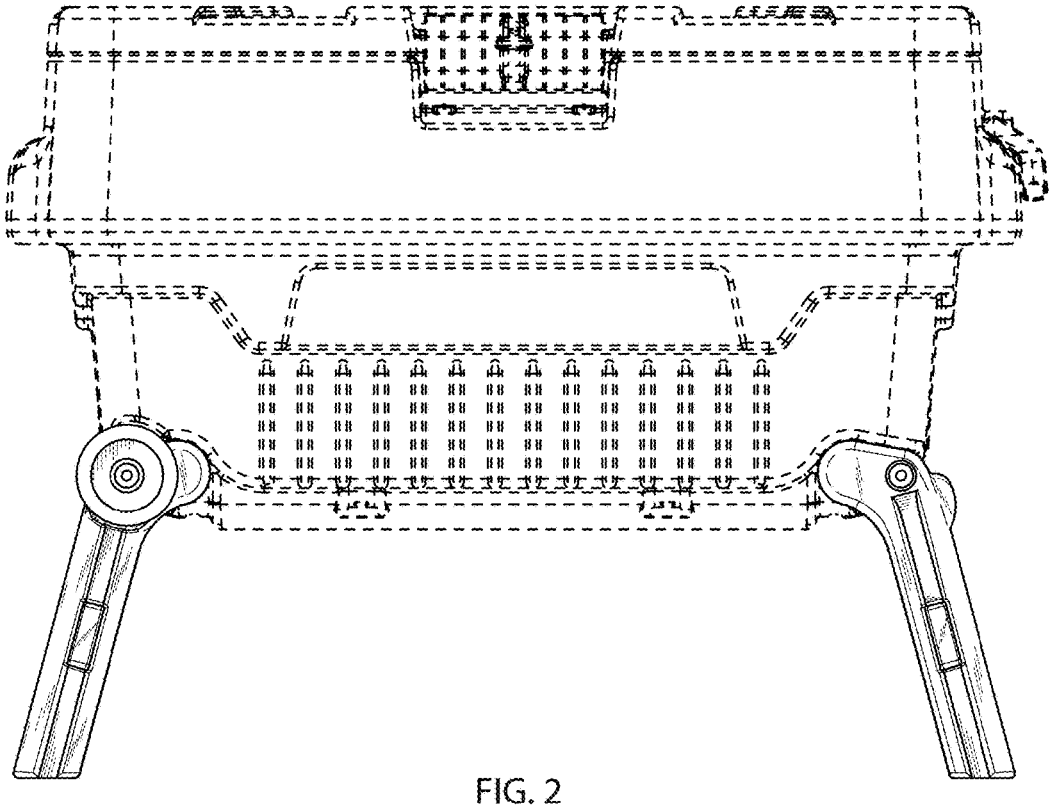
FIG. 2
(Amended)

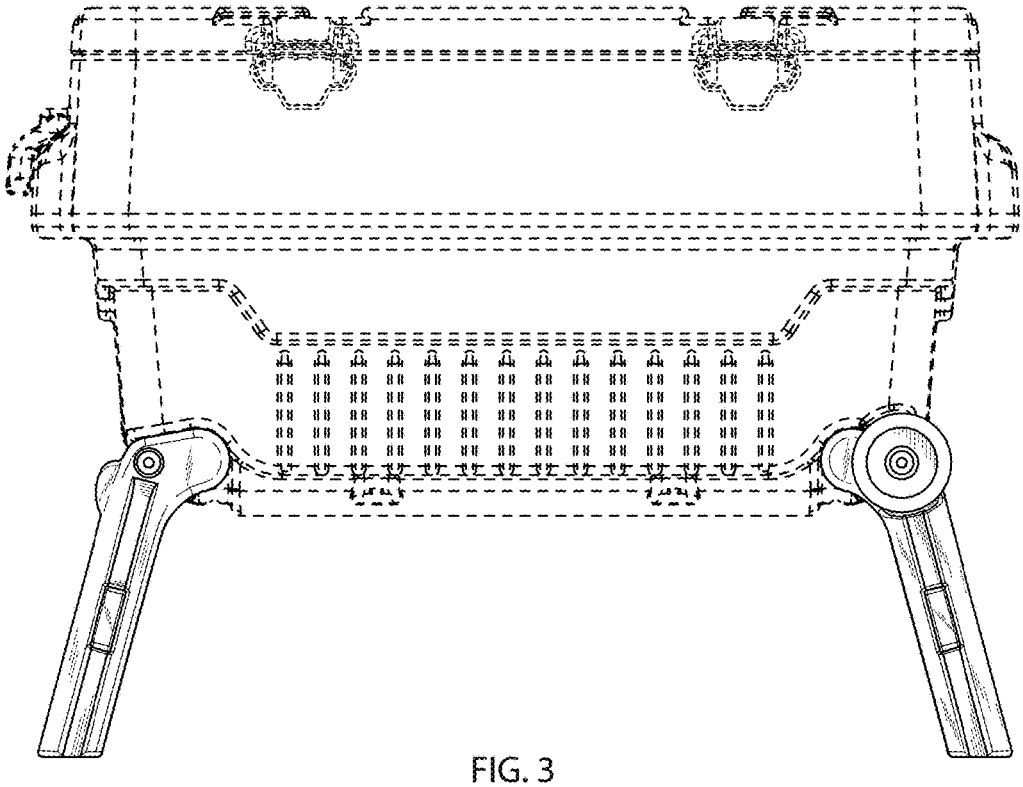
FIG. 3
(Amended)

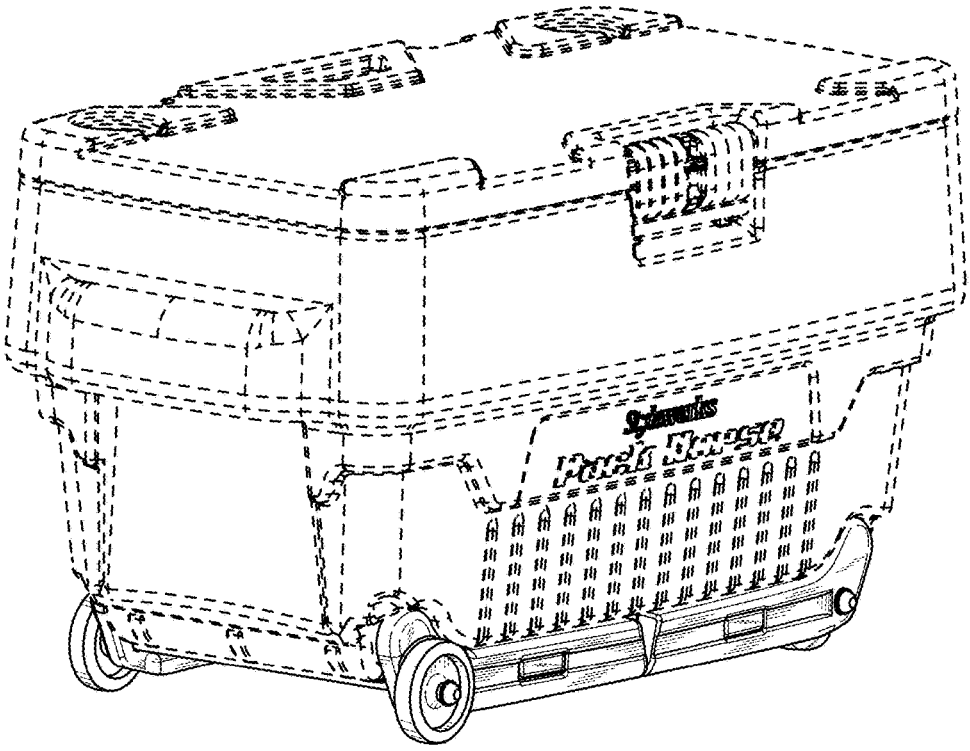
FIG. 4
(New)

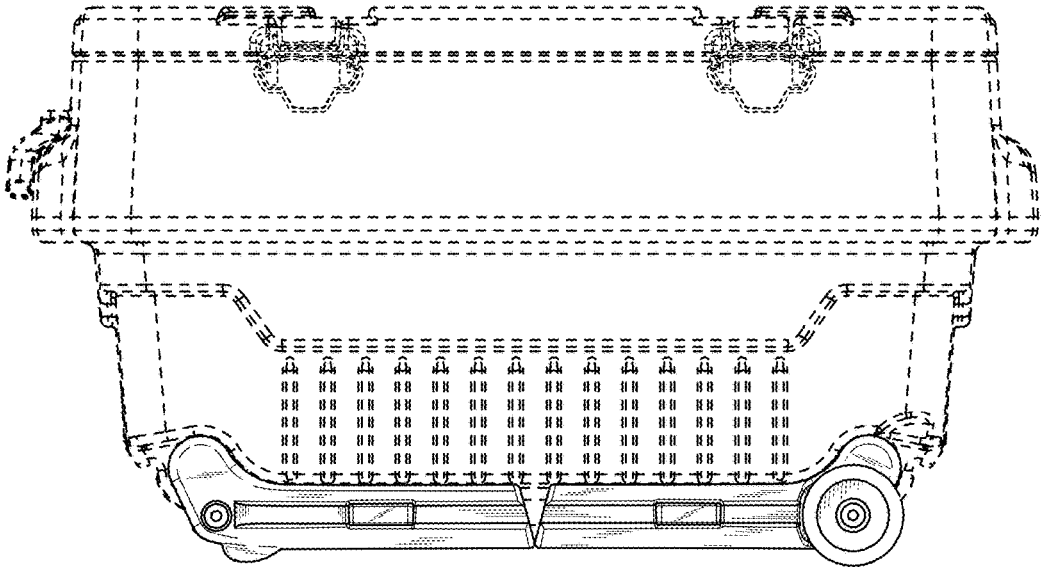
FIG. 5
(Amended)

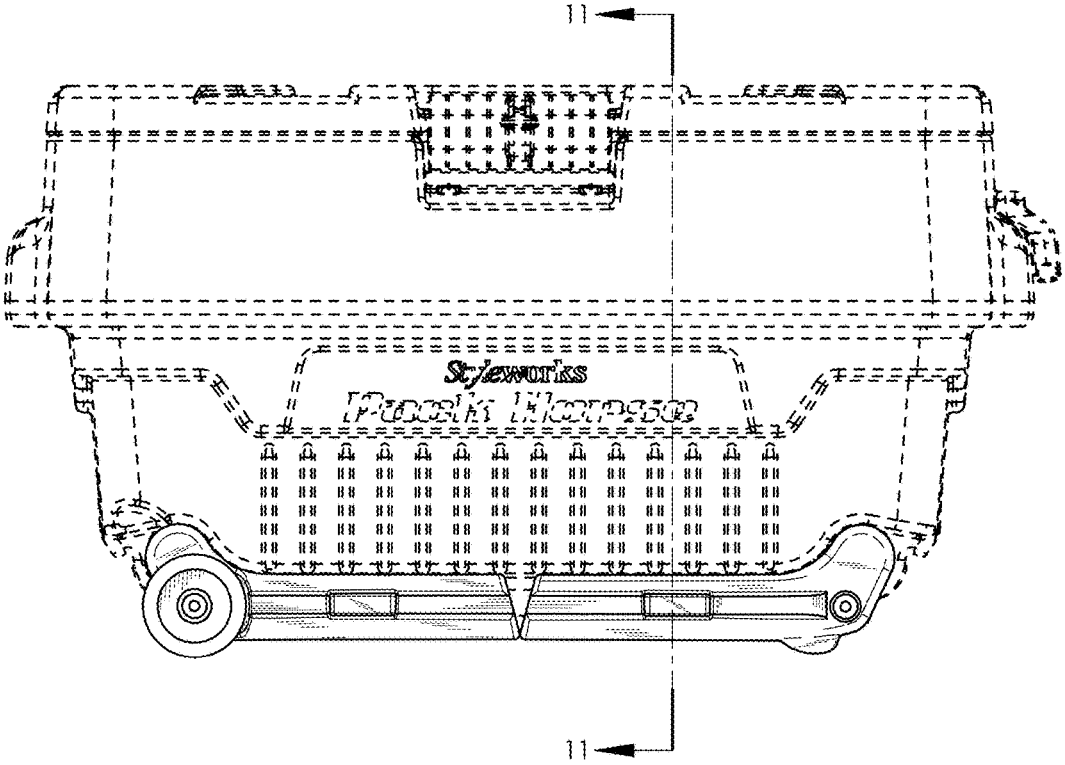
FIG. 6
(Amended)

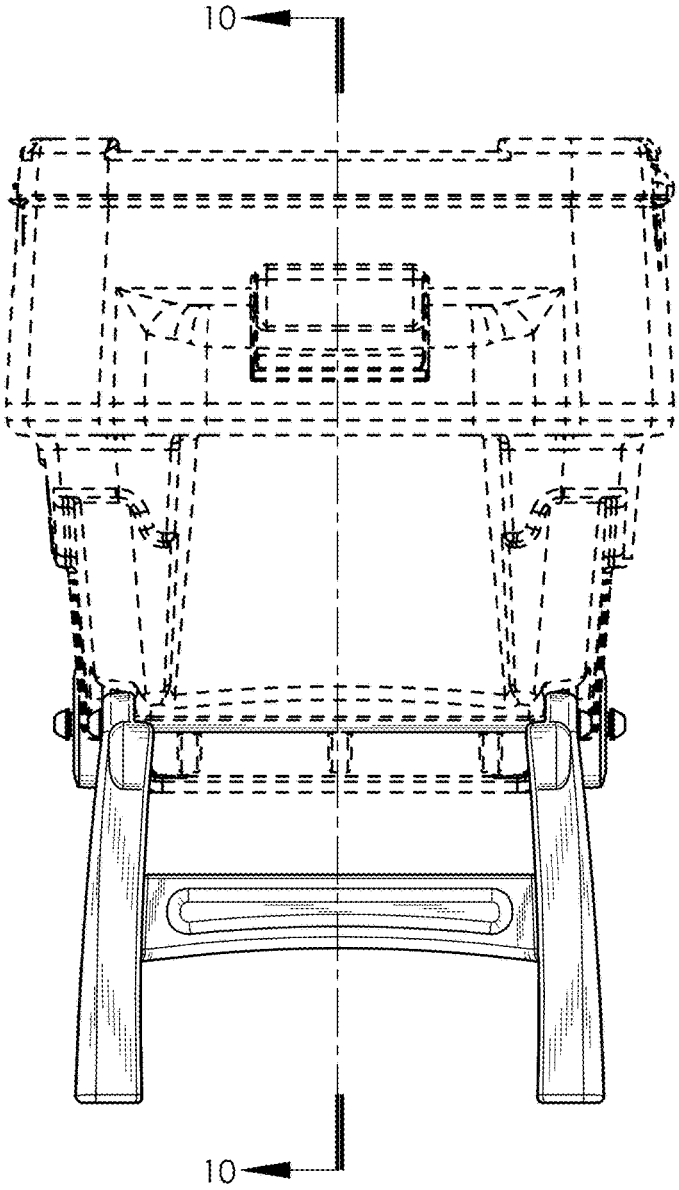
FIG. 7
(Amended)

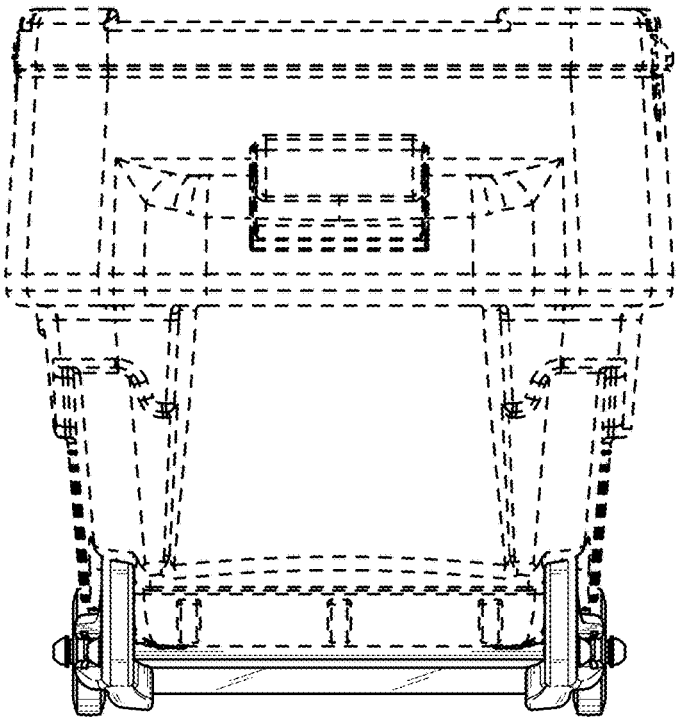
FIG. 8
(Amended)

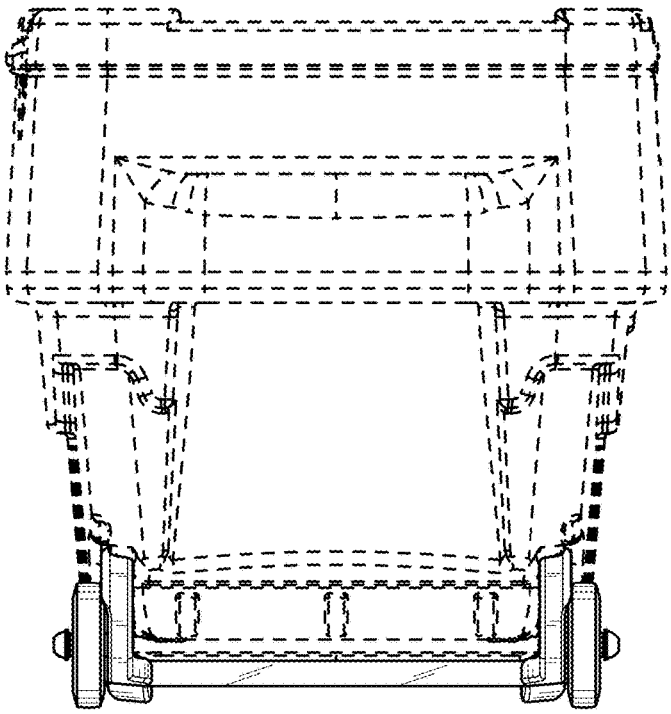
FIG. 9
(New)

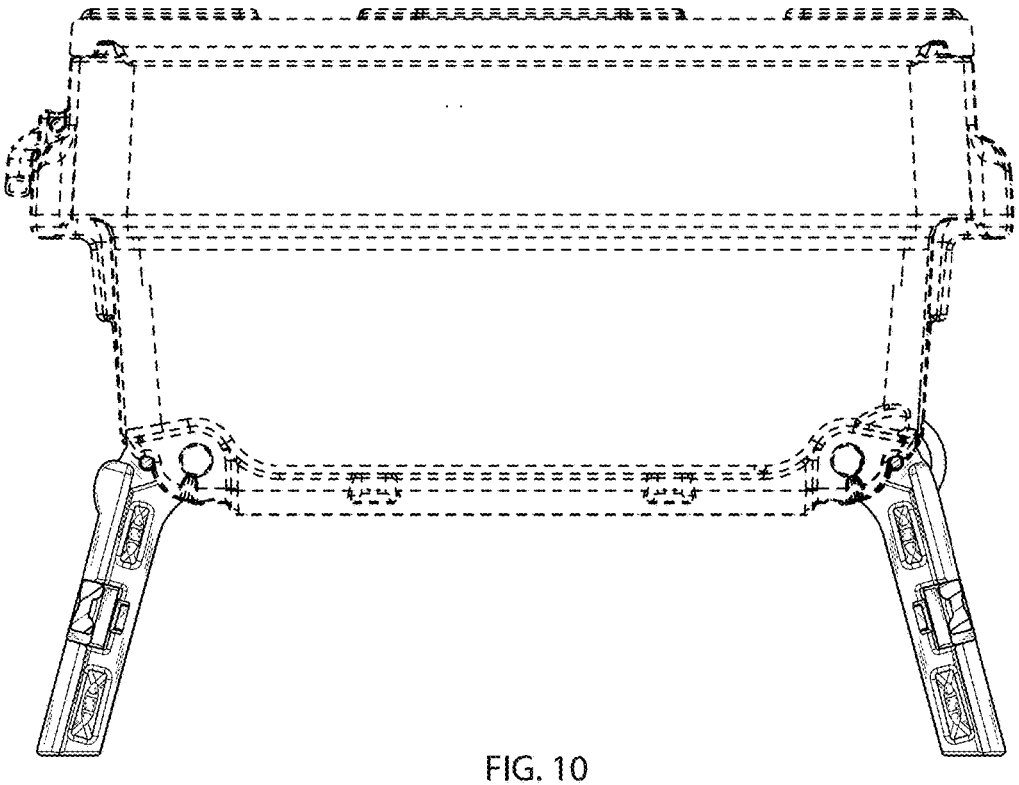
FIG. 10
(New)

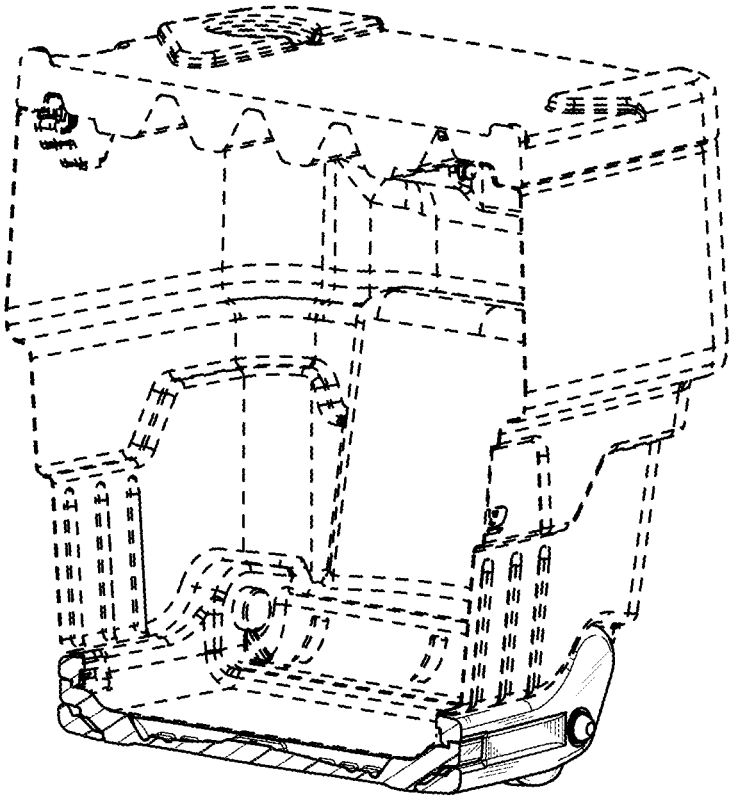
FIG. 11
(New)